(12) United States Patent  (10) Patent No.: US 8,681,420 B2
Sugaya et al.  (45) Date of Patent: Mar. 25, 2014

(54) OPTICAL TRANSMISSION SYSTEM

(75) Inventors: Yasushi Sugaya, Kawasaki (JP);
Takehiro Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 13/169,136

(22) Filed: Jun. 27, 2011

(65) Prior Publication Data

US 2012/0002270 A1  Jan. 5, 2012

(30) Foreign Application Priority Data

Jun. 30, 2010  (JP) .................. 2010-148717

(51) Int. Cl.
*H04B 10/17* (2011.01)
*H04J 1/00* (2006.01)

(52) U.S. Cl.
USPC ..................................... 359/341.1

(58) Field of Classification Search
USPC ................... 359/341.1; 398/74, 160
See application file for complete search history.

(56) References Cited

U.S. PATENT DOCUMENTS

| | | | | |
|---|---|---|---|---|
| 5,841,557 | A * | 11/1998 | Otsuka et al. | 398/65 |
| 6,038,357 | A * | 3/2000 | Pan | 385/24 |
| 7,133,196 | B1 * | 11/2006 | Lee et al. | 359/337.4 |
| 2002/0141008 | A1 | 10/2002 | Chbat et al. | 359/110 |
| 2010/0315701 | A1 * | 12/2010 | Takeyama | 359/341.3 |
| 2011/0170869 | A1 * | 7/2011 | Mandai et al. | 398/65 |

FOREIGN PATENT DOCUMENTS

EP  866573 A2  9/1998
JP  10-262001  9/1998

OTHER PUBLICATIONS

Davidson, C. R. et al., "Spectral Dependence of Polarization Hole-Burning", Optical Fiber Communication Conference, 2006 and the 2006 National Fiber Optic Engineers Conference. OFC 2006, Mar. 5, 2006, pp. 1-3.
Pilipetskii, A. N. et al., "Spectral hole-burning in long-haul WDM transmission (invited)",Optical Fiber Communication Conference, 2004. OFC 2004, vol. 2 vol. 2, Feb. 23, 2004, pp. 1-3.
Sudo, Shoichi "Erbium-Doped Optical-Fiber Amplifier", Optronics Co., Ltd. Nov. 21, 1999, English Translation, pp. 59-61 marked with boxes.
Wysocki, Paul et al., "Polarization Dependent Gain in Erbium-Doped Fiber Amplifiers: Computer Model and Approximate Formulas", Journal of Lightwave Technology, vol. 14, No. 4, Apr. 1, 1996, pp. 572-584.

* cited by examiner

*Primary Examiner* — Eric Bolda
(74) *Attorney, Agent, or Firm* — Fujitsu Patent Center

(57) ABSTRACT

An optical transmission system includes an optical transmitter that sends signal light to a transmission path, an optical receiver that receives the signal light from the transmission path, and an optical amplifier that is provided on the transmission path and that amplifies the signal light, the optical amplifier being configured to control a gain characteristic of the optical amplifier such that a power of signal light having a wavelength included within a wavelength range in which polarization hole burning occurs is higher than a power of another signal light having a wavelength outside the wavelength range.

12 Claims, 7 Drawing Sheets

OPTICAL TRANSMISSION SYSTEM

CROSS-REFERENCE TO RELATED APPLICATIONS

This application is based upon and claims the benefit of priority of the prior Japanese Patent Application No. 2010-148717, filed on Jun. 30, 2010, the entire contents of which are incorporated herein by reference.

FIELD

The embodiments discussed herein are related to optical transmission systems that optically repeat signal light.

BACKGROUND

For the purpose of reducing the cost of optical networks in recent years, optical repeaters that do not utilize photoelectric conversion have been used, and the repeating distance thereof has been increased. In order to extend a repeating segment based on a non-reproducing method (i.e., a method not utilizing photoelectric conversion) by increasing the repeating distance, it is necessary to focus attention on the transmission quality of signal light to be transmitted. For example, with regard to an optical amplifier, for performing optical repeating, provided on an optical transmission path, polarization hole burning (PHB) is known to occur in accordance with the wavelength of the signal light, as discussed in "Spectral Dependence of Polarization Hole-Burning", Davidson C. R. et al., Optical Fiber Communication Conference, 2006 and the 2006 National Fiber Optic Engineers Conference (OFC 2006) 5-10 Mar. 2006 and "Polarization Dependent Gain in Erbium-Doped Fiber Amplifiers: Computer Model and Approximate Formulas", Paul Wysocki and Vincent Mazurczyk, Journal of Lightwave Technology, Vol. 14, No. 4, April 1996. Transmission quality may be adversely affected depending on the wavelength of the signal light to be amplified. As discussed in "Erbium-Doped Optical-Fiber Amplifier", Shoichi Sudo, Optronics Co., Ltd., pp. 59-61 with regard to, for example, a rare-earth-doped optical-fiber amplifier, PHB is a phenomenon in which the gain of an optical amplifier fluctuates depending on the polarization state of signal light and excitation light.

When signal light with a high power level is input to a rare-earth-doped optical-fiber amplifier, the gain of light having a polarization direction that is parallel to the polarization direction of the input signal light is reduced in a PHB-occurring wavelength range. The fluctuating gain in the rare-earth-doped optical-fiber amplifier has an effect not only on the signal light but also on amplified spontaneous emission (ASE) occurring within the optical fiber. ASE is light in a non-polarized state and includes a polarized component that is parallel and a polarized component that is orthogonal to the polarization direction of the signal light. In the ASE, the polarized component parallel to the signal light is solely affected by the fluctuating gain caused by PHB. Specifically, the occurrence of PHB causes the gain of the signal light and the gain of the polarized component, of the ASE, parallel to the signal light to be reduced but does not cause the gain of the polarized component, of the ASE, orthogonal to the signal light to be reduced. Therefore, in the ASE occurring in the optical fiber, a difference occurs between the gain of the polarized component parallel to the signal light and the gain of the polarized component orthogonal to the signal light. Consequently, a proportion of the polarized component, of the ASE, orthogonal to the signal light relatively increases as compared with when there is no PHB, thus affecting the transmission quality of the signal light within the corresponding wavelength range, particularly, an optical signal-to-noise ratio (OSNR).

In view of the characteristics of the aforementioned optical amplifier, there is still room for improvement with regard to the transmission quality of signal light in an optical transmission system that performs optical repeating.

SUMMARY

According to an aspect of the invention, an optical transmission system includes an optical transmitter that sends signal light to a transmission path, an optical receiver that receives the signal light from the transmission path, and an optical amplifier that is provided on the transmission path and that amplifies the signal light, the optical amplifier being configured to control a gain characteristic of the optical amplifier such that a power of signal light having a wavelength included within a wavelength range in which polarization hole burning occurs is higher than a power of another signal light having a wavelength outside the wavelength range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
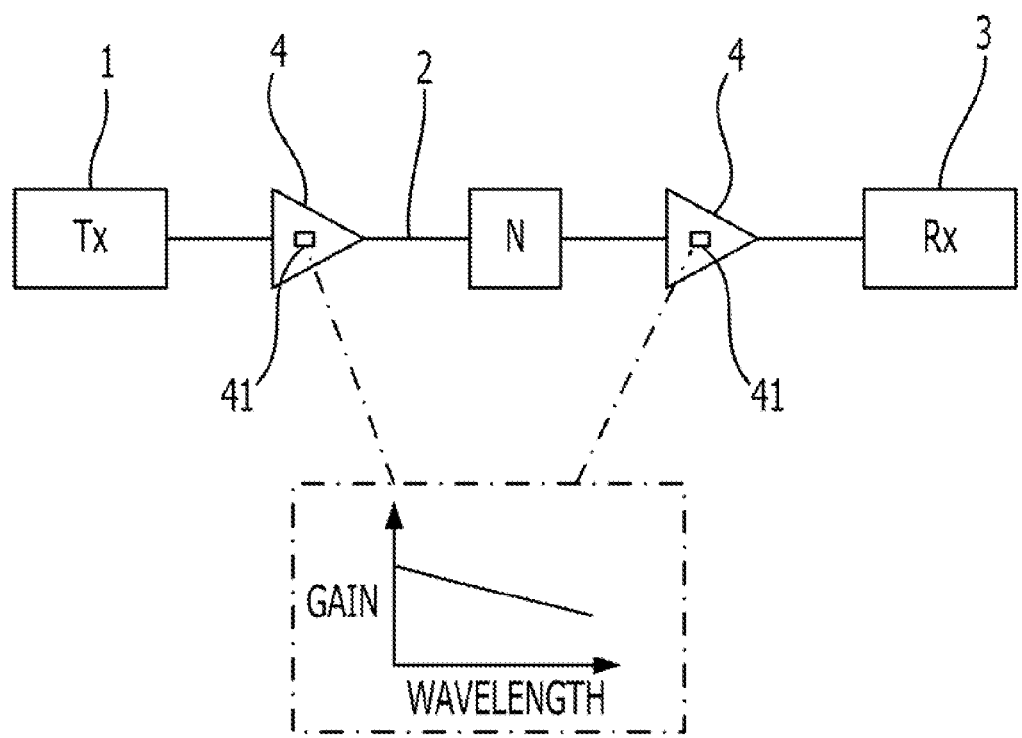
FIG. 1 schematically illustrates an optical transmission system according to an embodiment.

FIG. 1 illustrates an optical transmission system according to an embodiment.

The optical transmission system shown in FIG. 1 is an optical transmission system in which an optical receiver (Rx) 3 receives signal light sent from an optical transmitter (Tx) 1 via a transmission path 2 and uses an optical fiber as the transmission path 2. The transmission path 2 is provided with one or more optical amplifiers 4 that perform optical repeating. The transmission path 2 may also include a node N for performing, for example, optical add/drop multiplexing. Such an optical transmission system may be included in a known network, such as a point-to-point network, a star network, or a mesh network, for example.

The optical amplifiers 4 may each be formed using, for example, an erbium-doped fiber amplifier (EDFA), which is a type of a rare-earth-doped optical-fiber amplifier. Although an EDFA, which is a rare-earth-doped optical-fiber amplifier, is described as an example, an optical amplifier having a different structure having PHB may be considered.

In each optical amplifier 4 formed using an EDFA, PHB occurs in a specified wavelength range based on the characteristics of the EDFA. Specifically, when an EDFA, PHB is generated in a wavelength range of about 1525 nm to about 1535 nm with respect to a gain peak, and the OSNR of signal light having a wavelength within this wavelength range may be lowered. Improving the OSNR of signal light affected by PHB is discussed below. For example, when the optical transmission system in FIG. 1, the gain characteristics of each optical amplifier 4 may be controlled by a corresponding controller 41 such that the power of signal light having a wavelength within the about 1525 nm to about 1535 nm wavelength range is higher than the power of signal light having a wavelength outside the about 1525 nm to about 1535 nm range (e.g., a wavelength higher than or equal to about 1535 nm in the case of a C-band). Regarding the aforementioned wavelength range, the wavelength range may change with respect to the gain peak depending on the depth of PHB.

In the case of the optical amplifiers 4 shown in FIG. 1, wavelength dependency of gain is set as shown in a graph surrounded by a dashed-dotted line in FIG. 1. Referring to the graph in FIG. 1, the shorter wavelength side (left side of the graph) has higher gain, whereas the longer wavelength side has lower gain. Specifically, the gain of each optical amplifier 4 is inclined so that the gain is higher in the PHB-occurring wavelength range. The wavelength dependency of gain in each optical amplifier 4 in this embodiment may be controlled by, for example, using the corresponding controller 41 to adjust the power of excitation light supplied to an erbium-doped fiber so as to change the inversion rate.

Figure 3A:
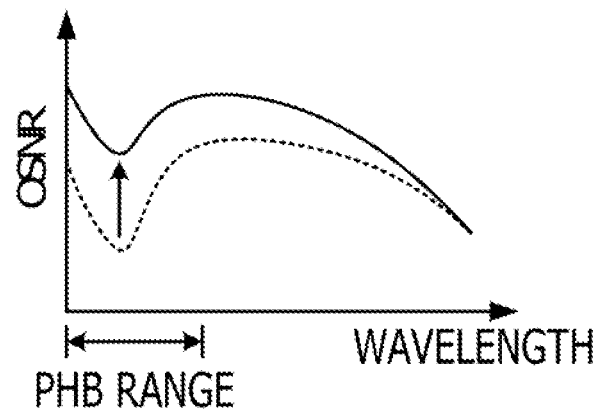
FIGS. 3A to 3C illustrate the operation of the optical amplifiers shown in FIGS. 1 and 2.

By setting the wavelength dependency of each optical amplifier 4 so that the gain is higher at the shorter wavelength side, the OSNR of optically repeated and amplified signal light is improved. The improvement is represented by the difference between the dotted line and the solid line in FIG. 3A. Specifically, because the gain of the optical amplifier 4 has the aforementioned wavelength dependency, the amplified gain is relatively high at the shorter wavelength side, whereas the amplified gain is relatively low at the longer wavelength side. Therefore, regarding the signal light amplified by this optical amplifier 4, an amplification factor with respect to the power of signal light in the wavelength range in which the gain is reduced due to the occurrence of PHB is raised, whereby the ratio of signal light to noise in the amplified signal light increases, as compared with that in the related art. As shown with the solid line in the graph in FIG. 3A, the OSNR of the signal light having the wavelength within the PHB-occurring wavelength range is improved, as compared with that of the related art shown with the dotted line.

Figure 2:
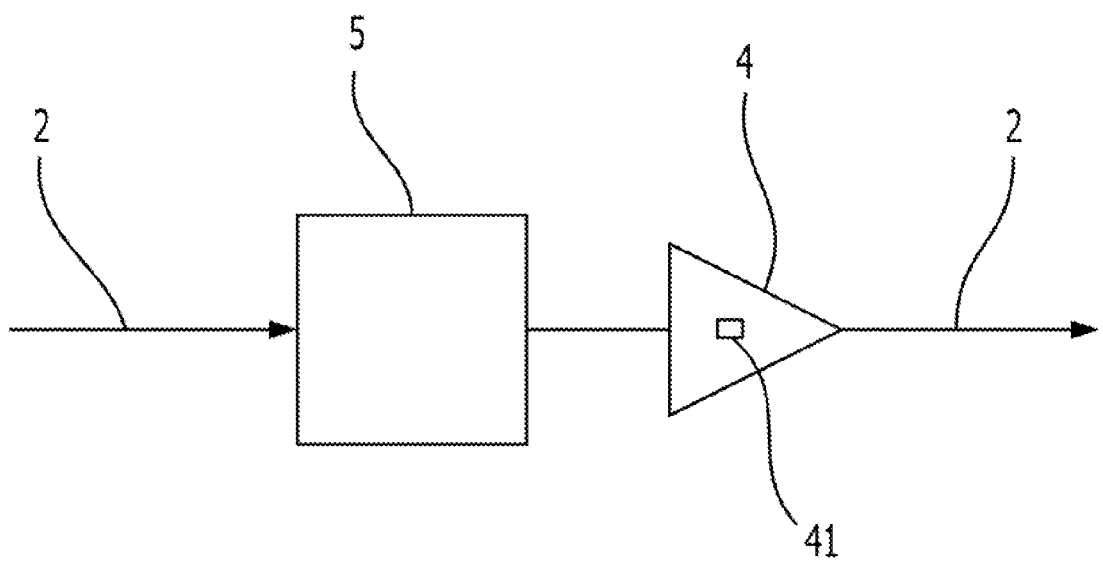
FIG. 2 schematically illustrates an optical amplifier according to an embodiment.

FIG. 2 illustrates one of the optical amplifiers 4 according to an embodiment that may achieve the advantage of improving the OSNR, as in the embodiment shown in FIG. 1. In the case of the embodiment shown in FIG. 2, a variable gain equalizer 5 is optically connected to the front side of the optical amplifier 4. The variable gain equalizer 5 controls the power of signal light of each wavelength. Another variable gain equalizer 5 may also be provided at the rear side of the optical amplifier 4. By providing the variable gain equalizer 5, the wavelength dependency of gain does not need to be set for the optical amplifier 4 in the embodiment in FIG. 2, unlike the embodiment in FIG. 1.

The variable gain equalizer 5 may include, for example, a variable optical attenuator (VOA) that adjusts the power of signal light of each wavelength. Alternatively, the variable gain equalizer 5 may include multiple levels of optical filters having a Mach-Zehnder optical waveguide structure and being optically connected with each other. With this optical-filter-type variable gain equalizer 5, the transparent wavelength characteristics of the entire variable gain equalizer 5 are controlled by phase-difference adjustment in the optical filter for each level so that the power of signal light of each wavelength is adjusted in accordance with the transparent wavelength characteristics, whereby the power-adjusted signal light is input to the optical amplifier 4.

Figure 3B:
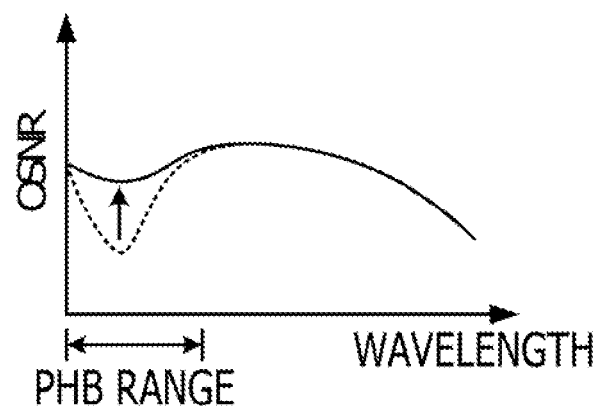

The variable gain equalizer 5 adjusts the power of signal light of each wavelength, and is controlled by the corresponding controller 41 such that the power of signal light having a corresponding wavelength within the PHB-occurring wavelength range in the optical amplifier 4 is higher than the power of signal light having a wavelength outside the aforementioned wavelength range. Consequently, the signal light output from the variable gain equalizer 5 is input to the optical amplifier 4 in a state such that the power of the signal light having the wavelength within the wavelength range in which the gain is reduced due to the occurrence of PHB is higher than the power of signal light having other wavelengths. Since the power of the signal light within the wavelength range in which the gain is reduced due to the occurrence of PHB is at a higher level than other pre-amplified signal light, the hole where the level is depressed is made shallower even with the occurrence of PHB, whereby the ratio of signal light to noise increases, as compared with that in the related art. For example, as shown with a solid line in a graph in FIG. 3B, the OSNR of signal light having the wavelength within the PHB-occurring wavelength range is improved, as compared with that of the related art shown with a dotted line.

Figure 3C:
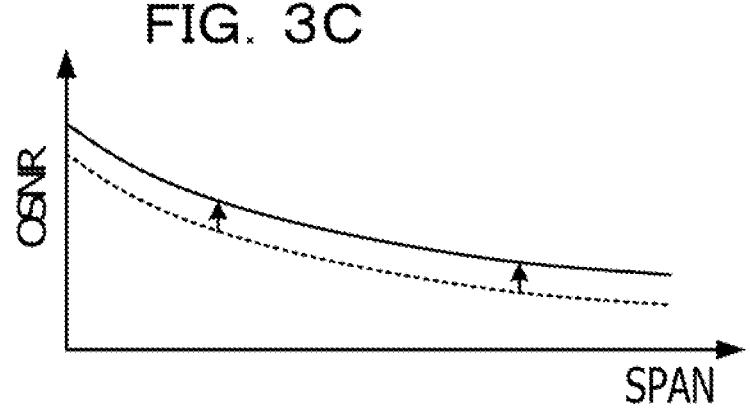

FIG. 3C is a graph showing how the OSNR of the signal light is improved relative to the number of repeater spans in the optical transmission system provided with a plurality of the optical amplifiers 4 shown in FIGS. 1 and 2 as repeater stations on the transmission path 2. In the graph of FIG. 3C, the abscissa denotes an increase in the number of spans, whereas the ordinate denotes an OSNR value.

As a result of a reduced PHB effect during amplification at each repeater station, the OSNR of signal light is improved in the entire system, as shown by a comparison of a solid line in FIG. 3C with the case of the related art shown with a dotted line.

Figure 4:
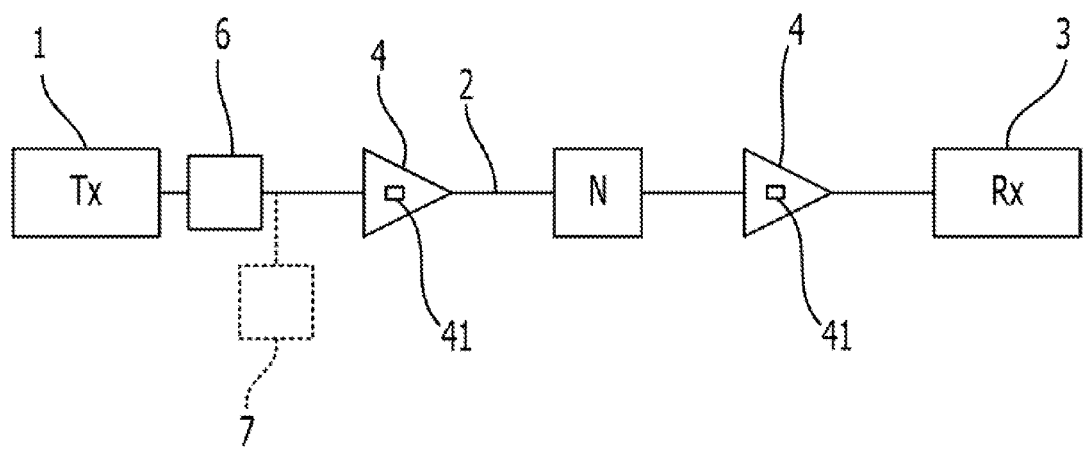
FIG. 4 schematically illustrates an optical transmission system according to an embodiment.

FIG. 4 illustrates an optical transmission system according to an embodiment, in which the transmission path 2 and the optical receiver 3 are the same as those in the embodiment illustrated in FIG. 1. The optical transmitter 1 in the optical transmission system in FIG. 4 includes a polarization controller 6 at the rear side thereof for changing the polarization state of signal light to be transmitted, having a wavelength within the wavelength range in which PHB occurs in accordance with the characteristics of the optical amplifiers 4, to a circularly polarized state. Thus, the wavelength dependency of gain shown in FIG. 1 does not need to be set for the optical amplifiers 4 in the embodiment in FIG. 4.

For example, the optical transmitter 1 includes, for each wavelength, a signal light source that generates signal light by a method of using a Mach-Zehnder optical modulator to modulate light from a light source, such as a semiconductor laser (LD), in accordance with a data signal. Among the signal light sources for the respective wavelengths, the polarization controller 6 is provided for the signal light source that generates signal light having a wavelength within the wavelength range in which PHB occurs in accordance with the characteristics of the optical amplifiers 4, and is configured to increase the ellipticity of the polarization state of the signal light generated from the aforementioned signal light source to 50% or higher so as to change the polarization state to a circularly polarized state. Since PHB is dependent on the polarization state of the signal light input to each optical amplifier 4, as mentioned above, the occurrence of PHB may be suppressed by increasing the ellipticity of the polarization state of the signal light having the wavelength within the PHB-occurring wavelength range. By suppressing the occurrence of PHB in the optical amplifiers 4 provided as repeater stations, the OSNR of the signal light to be transmitted is improved as repeater spans increase, as compared with the related art.

Figure 5:
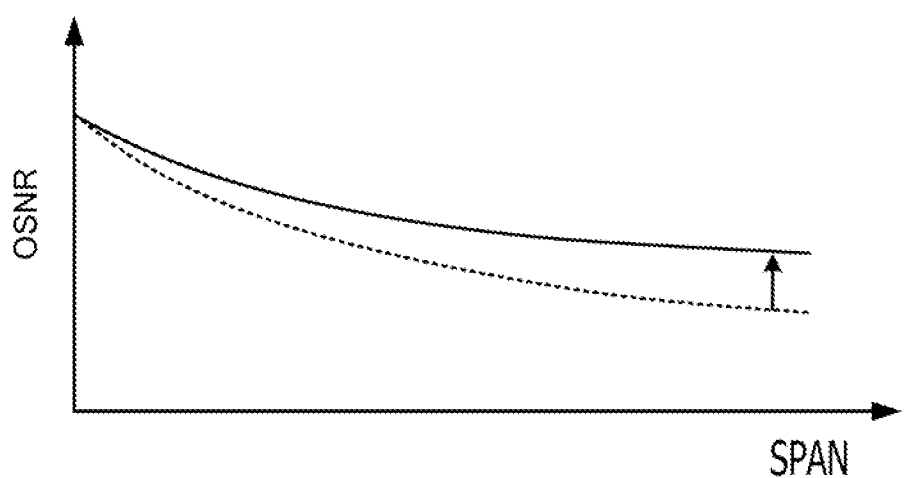
FIG. 5 illustrates the operation of an optical transmitter shown in FIG. 4.

FIG. 5 is a graph showing how the OSNR of the signal light to be transmitted is improved relative to the number of repeater spans in the optical transmission system shown in FIG. 4. In the graph in FIG. 5, the abscissa denotes an increase in the number of spans, whereas the ordinate denotes an OSNR value. As a result of polarization control of the signal light by the polarization controller 6, the occurrence of PHB during amplification by the optical amplifier 4 at each repeater station is suppressed, whereby the OSNR improvement effect increases as the number of spans increases, as shown by a comparison of a solid line in FIG. 5 with the case of the related art shown with a dotted line in FIG. 5.

The polarization controller 6 may include a combination of phase plates including a λ/2 plate and a λ/4 plate. The line between the signal light sources of the optical transmitter 1 and the polarization controller 6 is may be fixed so as to reduce the likelihood of and/or prevent a change in the polarization state. In order to initialize the polarization state of the signal light output from the polarization controller 6, a polarization analyzer 7 denoted by a dotted line is connected at the time of the initialization so as to monitor output light from the polarization controller 6. During activation, the polarization controller 6 is adjusted while monitoring the signal light using the polarization analyzer 7 so as to set the polarization state of the signal light. Upon completion of the initialization, the polarization analyzer 7 is removed so that the operation thereafter may be commenced.

Figure 6:
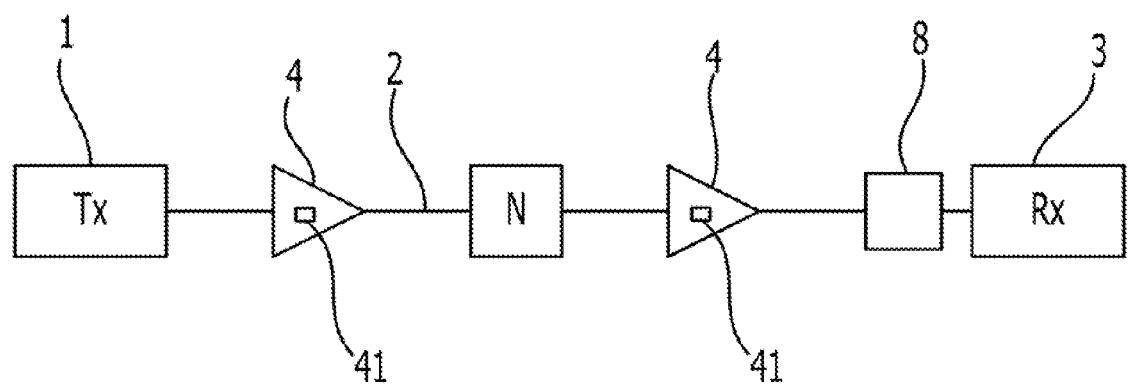
FIG. 6 schematically illustrates an optical transmission system according to an embodiment.

FIG. 6 illustrates an optical transmission system according to an embodiment, in which the optical transmitter 1 and the transmission path 2 are the same as those in the embodiment illustrated in FIG. 1. The optical receiver 3 in the optical transmission system in FIG. 6 includes a band-pass filter 8 at the front side thereof for transmitting a specified band of the signal light having the wavelength within the wavelength range in which PHB occurs in accordance with the characteristics of the optical amplifiers 4. Thus, the wavelength dependency of gain shown in FIG. 1 does not need to be set for the optical amplifiers 4 in the embodiment in FIG. 6. However, setting the wavelength dependency of gain in the embodiment illustrated in FIG. 1 for each optical amplifier 4 in the embodiment shown in FIG. 6 may further increase the OSNR improvement effect.

For example, the optical receiver 3 includes a receiver for each wavelength of signal light. Among these receivers, the band-pass filter 8 is optically connected to the front side of the receiver that receives the signal light having the wavelength within the wavelength range in which PHB occurs in accordance with the characteristics of the optical amplifiers 4. Regarding a signal component and a noise component included in the signal light to be received, the band-pass filter 8 transmits a band that is broader than the band of the signal component but narrower than a total band including the noise component relative to the signal component. Specifically, the signal light is received by the receiver after a certain band of the signal light having the wavelength within the PHB-occurring wavelength range is limited by the band-pass filter 8.

Figure 7:
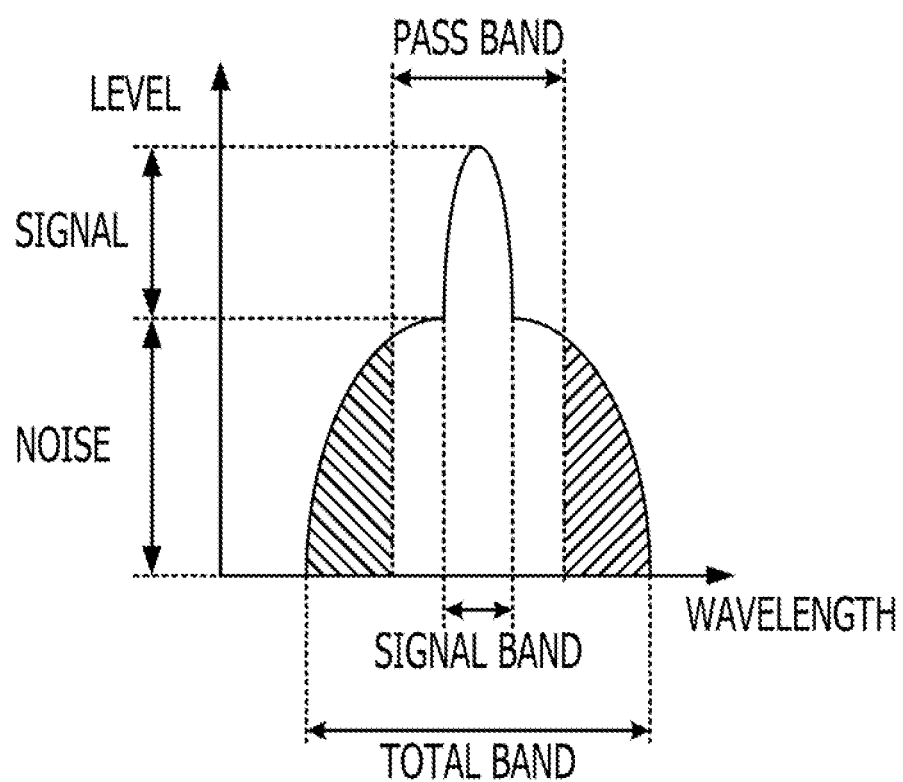
FIG. 7 illustrates the operation of an optical receiver shown in FIG. 6.

As shown in FIG. 7, when the signal light is expressed in a graph in which the ordinate denotes the power level of the signal light and the abscissa denotes the wavelength, the signal light of each wavelength is received together with a noise component including an ASE component. As mentioned above, in the PHB-occurring wavelength range, the signal light and the ASE with a polarized component parallel to the signal light are reduced in gain. On the other hand, since the ASE with a polarized component orthogonal to the signal light is not reduced in gain, the ASE with the polarized component orthogonal to the signal light relatively increases. Specifically, in the PHB-occurring wavelength range, the ASE with the polarized component orthogonal to the signal light relatively increases in an ASE band of each channel, causing an ASE component outside the band of the signal light to increase as noise so as to become beat noise between ASEs (ASE-ASE).

As shown in FIG. 7, the band-pass filter 8 has a pass band that is broader than the signal band only including the wavelength of the signal component but narrower than the total band including the signal component and the noise component. Therefore, regarding the signal light having the wavelength within the PHB-occurring wavelength range, the band limitation by the band-pass filter 8 causes the ASE component outside the band of the signal component to be suppressed (the shaded areas in FIG. 7 are suppressed). Specifically, by providing the band-pass filter 8, the aforementioned ASE-ASE beat noise occurring due to the increase in the ASE with the polarized component orthogonal to the signal light is reduced, thereby improving the OSNR of the signal light.

With the optical transmission system according to this proposal, the power of signal light with a wavelength at which ASE with a polarized component relatively increases is set to be higher than that of signal light of other wavelengths. Thus, the ratio of signal light to noise is increased for the equivalent amount of increased power, thereby improving the OSNR of the signal light. Consequently, the transmission quality of the signal light may be enhanced.

Furthermore, with the optical transmission system according to this proposal, the ellipticity of the polarization state of signal light having a wavelength within the corresponding wavelength range is increased so as to change the polarization state to a circularly polarized state, thereby improving the OSNR of the signal light. Consequently, the transmission quality of the signal light may be enhanced.

Furthermore, with the optical transmission system according to this proposal, the optical receiver receives signal light after band limitation so that a noise component relative to a signal component included in the signal light is suppressed, thereby improving the OSNR of the signal light. Consequently, the transmission quality of the signal light may be enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical transmission system comprising:
   an optical transmitter that sends signal light to a transmission path;
   an optical receiver that receives the signal light from the transmission path; and
   an optical amplifier that is provided on the transmission path and that amplifies the signal light, the optical amplifier amplifying light only for a C-band,
   the optical amplifier being configured to control a gain characteristic of the optical amplifier such that a power of signal light having a wavelength included within a wavelength range in which polarization hole burning occurs is higher than a power of another signal light having a wavelength outside the wavelength range.

2. The optical transmission system according to claim 1, further comprising:
   a gain characteristic controller is provided so that a tilt of a gain of the optical amplifier relative to a wavelength is high in the wavelength range and lower outside of the wavelength range.

3. The optical transmission system according to claim 1, further comprising:
   a variable gain equalizer that adjusts the power of the signal light is optically connected to a front side or a rear side of the optical amplifier so that the power of the signal light having the wavelength within the wavelength range is higher than the power of the another signal light having the wavelength outside the wavelength range.

4. The optical transmission system according to claim 1, wherein the optical amplifier includes an erbium-doped optical-fiber amplifier, and the wavelength range in which the polarization hole burning occurs is between about 1525 nm and about 1535 nm.

5. The optical transmission system according to claim 1, wherein the optical transmitter includes a polarization controller that increases the ellipticity of a polarization state of the signal light having the wavelength within the wavelength range.

6. The optical transmission system according to claim 5, wherein the polarization controller sets the ellipticity of the polarization state of the signal light to 50% or higher.

7. The optical transmission system according to claim 1, wherein the optical receiver includes a band-pass filter that transmits a band that is broader than a band of a signal component included in the signal light having the wavelength within the wavelength range but narrower than a total band including a noise component relative to the signal component.

8. The optical transmission system according to claim 1, wherein the optical amplifier includes an erbium-doped optical-fiber amplifier, and
   wherein a band-pass filter receives signal light having a wavelength within a wavelength range between about 1525 nm and about 1535 nm.

9. The optical transmission system according to claim 1, wherein the optical receiver includes a filter with a pass band that is broader than a band of a signal component included in the signal light but narrower than a total band including a noise component relative to the signal component, and receives the signal light after limiting a band of the signal light having the wavelength within the wavelength range.

10. The optical transmission system according to claim 1, further comprising:
    a gain characteristic controller that controls the gain characteristic of the optical amplifier so that the power of the signal light having the wavelength included within the wavelength range is higher than the power of the signal light having the wavelength outside the wavelength range.

11. A control method for an optical transmission system including an optical amplifier, the method comprising:
    receiving signal light; and
    controlling a gain characteristic of the optical amplifier such that a power of signal light having a wavelength included within a wavelength range in which polarization hole burning occurs is higher than a power of another signal light having a wavelength outside the wavelength range, the optical amplifier amplifying light only for a C-band.

12. The optical transmission system according to claim 1, wherein the optical amplifier amplifies the signal light using a rare-earth-doped fiber and includes a controller that controls a power of an excitation light supplied to the rare-earth-doped fiber so as to obtain the gain characteristic of the optical amplifier.

* * * * *